US011919199B2

(12) United States Patent
Carlsson et al.

(10) Patent No.: US 11,919,199 B2
(45) Date of Patent: *Mar. 5, 2024

(54) CUTTING AND DUST OR SLURRY COLLECTING ASSEMBLY AND WORKING MACHINE

(71) Applicant: HUSQVARNA AB, Huskvarna (SE)

(72) Inventors: Pär Carlsson, Gothenburg (SE); Håkan Pinzani, Gothenburg (SE); Paulo Varella, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 40 days.

This patent is subject to a terminal disclaimer.

(21) Appl. No.: 15/497,400

(22) Filed: Apr. 26, 2017

(65) Prior Publication Data

US 2017/0225358 A1 Aug. 10, 2017

Related U.S. Application Data

(63) Continuation of application No. 13/980,564, filed as application No. PCT/SE2012/000002 on Jan. 18, 2012, now Pat. No. 9,662,800.

(30) Foreign Application Priority Data

Jan. 18, 2011 (WO) .................. PCT/SE2011/050053
Oct. 4, 2011 (SE) .................................... 1150915-5

(51) Int. Cl.
*B28D 7/02* (2006.01)
*B23D 45/16* (2006.01)
(Continued)

(52) U.S. Cl.
CPC .............. *B28D 7/02* (2013.01); *B23D 45/16* (2013.01); *B23D 59/006* (2013.01); *B26B 29/00* (2013.01);
(Continued)

(58) Field of Classification Search
CPC . B28D 7/02; B28D 1/045; B28D 1/04; B23D 59/006; B23D 45/16; B26B 29/00;
(Continued)

(56) References Cited

U.S. PATENT DOCUMENTS 1,035,735 A 8/1912 Pogue
1,099,610 A 6/1914 Long
(Continued)

FOREIGN PATENT DOCUMENTS

CN 1141229 A 1/1997
CN 1505556 A 6/2004
(Continued)

OTHER PUBLICATIONS

International Search Report and Written Opinion for International Application No. PCT/SE2011/050053 dated Sep. 29, 2011.
(Continued)

*Primary Examiner* — Jonathan G Riley
(74) *Attorney, Agent, or Firm* — Burr & Forman LLP

(57) ABSTRACT

A cutting and dust or slurry collecting assembly that comprises: a) a circular saw blade (4) b) a blade guard (5) c) a cover device (6), and the cover device (6) has a front end (31), a rear end (32), a top surface (34), a bottom surface (36), elongated sidewalls (35), and a longitudinal passage (45,46) for the saw blade, d) the blade guard (5) and the cover device (6) being pivotally connected or connectable to one another via a hinge (40) in or adjacent to a lower rear corner of the blade guard (5), such that the cover device and the blade guard can be turned in relation to each other, e) a discharge member (52) is provided at the rear of said hinge and has an outlet (58) which can be connected to a vacuum source, f) a connection member (12) connects the discharge member (52) with at least one of the longitudinal passage (45, 46) and the cut created rear of the longitudinal passage, (Continued)

g) that the direction of rotation of the saw blade (4) is such that a circumferential part of the blade which has passed beyond the bottom surface of the cover device will move in a direction upwards-rearward towards the bottom surface In particular a rear arm distance (LR) between the hinge (40) and the rear end (32) is bigger than 0.2 R and preferably bigger than 0.25 R, thereby enabling a turning of the cover device (6) by pressing the rear end (32) towards the structure to be cut.

19 Claims, 13 Drawing Sheets

(51) Int. Cl.
  *B23D 59/00* (2006.01)
  *B26B 29/00* (2006.01)
  *B26D 7/18* (2006.01)
  *B28D 1/04* (2006.01)

(52) U.S. Cl.
  CPC .......... *B26D 7/1863* (2013.01); *B28D 1/045* (2013.01); *Y10T 83/207* (2015.04); *Y10T 83/872* (2015.04); *Y10T 83/96* (2015.04)

(58) Field of Classification Search
  CPC ....... Y10T 83/872; Y10T 83/96; B27G 19/02; B27G 19/04
  See application file for complete search history.

(56) References Cited

U.S. PATENT DOCUMENTS

| | | | |
|---|---|---|---|
| 1,152,325 A | 8/1915 | Lawlor | |
| 2,344,262 A | 3/1944 | Odierna et al. | |
| 2,406,979 A | 9/1946 | Wolfe | |
| 2,673,725 A * | 3/1954 | Coates | B23D 59/002 144/43 |
| 5,056,268 A | 10/1991 | Wolff | |
| 5,167,215 A * | 12/1992 | Harding, Jr. | B23D 59/006 125/13.01 |
| 5,287,779 A | 2/1994 | Metzger, Jr. | |
| 5,675,895 A | 10/1997 | Mori et al. | |
| 5,774,992 A | 7/1998 | Lindenmuth | |
| 5,784,789 A | 7/1998 | Vargas | |
| 6,219,922 B1 | 4/2001 | Campbell et al. | |
| 6,561,063 B1 | 5/2003 | Mulford et al. | |
| 6,748,660 B2 * | 6/2004 | Buser | B23Q 11/0046 125/12 |
| 6,893,334 B1 * | 5/2005 | Stivers | B24B 23/028 451/354 |
| 6,935,939 B1 | 8/2005 | Buser et al. | |
| 7,300,339 B2 * | 11/2007 | Gaul | B24B 55/052 451/358 |
| 7,434,501 B2 | 10/2008 | Chuang | |
| 7,465,328 B2 * | 12/2008 | Trautner | B23D 59/006 173/71 |
| 7,571,720 B2 * | 8/2009 | Donnerdal | B23D 47/12 125/13.01 |
| 7,635,293 B2 | 12/2009 | Sun et al. | |
| 8,272,133 B2 | 9/2012 | Wascow | |
| 8,413,645 B2 | 4/2013 | Donnerdal et al. | |
| 8,898,913 B1 * | 12/2014 | Lones | B23D 45/16 125/13.03 |
| 2003/0221292 A1 | 12/2003 | Pozgay et al. | |
| 2003/0223836 A1 | 12/2003 | Pozgay et al. | |
| 2004/0117990 A1 | 6/2004 | Bohne et al. | |
| 2006/0101965 A1 | 5/2006 | Carroll et al. | |
| 2007/0074404 A1 * | 4/2007 | Zhang | B27B 9/02 30/376 |
| 2007/0164598 A1 * | 7/2007 | Johnson | B23D 47/005 299/39.3 |
| 2008/0163492 A1 * | 7/2008 | Johansson | B23D 59/006 30/124 |
| 2008/0271310 A1 | 11/2008 | Tracy et al. | |
| 2009/0019710 A1 | 1/2009 | Grossman et al. | |
| 2009/0025523 A1 | 1/2009 | Chen | |
| 2009/0183800 A1 * | 7/2009 | Loveless | B23D 59/006 144/252.1 |
| 2009/0236900 A1 | 9/2009 | Due et al. | |
| 2010/0037740 A1 | 2/2010 | Lin | |
| 2010/0043768 A1 | 2/2010 | Yokota et al. | |
| 2010/0251871 A1 | 10/2010 | Marsic et al. | |
| 2011/0061506 A1 * | 3/2011 | Frolov | B27G 19/02 83/102.1 |
| 2011/0079207 A1 * | 4/2011 | Guth | B23D 45/16 125/13.01 |
| 2013/0145634 A1 * | 6/2013 | Cuzdey | B27B 9/02 30/376 |

FOREIGN PATENT DOCUMENTS

| | | |
|---|---|---|
| CN | 1506194 A | 6/2004 |
| CN | 1919541 A | 2/2007 |
| CN | 101124062 A | 2/2008 |
| CN | 101171097 A | 4/2008 |
| CN | 101631637 A | 1/2010 |
| CN | 201493555 U | 6/2010 |
| DE | 102004060849 B3 | 4/2006 |
| EP | 0459121 A2 | 12/1991 |
| EP | 0734822 A2 * | 10/1996 |
| EP | 2170545 B1 | 4/2011 |
| GB | 1499692 A | 2/1978 |
| JP | 2003145507 A | 5/2003 |
| JP | 2003251624 A | 9/2003 |
| JP | 2008529817 A | 8/2008 |
| JP | 2009023004 A | 2/2009 |
| JP | 3153798 U | 9/2009 |
| WO | 9508422 A1 | 3/1995 |
| WO | 0119577 A1 | 3/2001 |
| WO | 02100597 A1 | 12/2002 |
| WO | 03057395 A1 | 7/2003 |
| WO | 2006088426 A1 | 8/2006 |
| WO | 2008075777 A1 | 6/2008 |
| WO | 2009011454 A1 | 1/2009 |
| WO | 2012099522 A1 | 7/2012 |

OTHER PUBLICATIONS

International Search Report and Written Opinion for International Application No. PCT/SE2012/000002 dated May 18, 2012.

International Preliminary Report on Patentability for International Application No. PCT/SE2012/000002 dated Apr. 10, 2013.

International Preliminary Report on Patentability for International Application No. PCT/SE2011/050053 dated Jul. 23, 2013.

Minnesota Rubber and QMR Plastics, Section 4 Designing Plastic Components, Copyright 2003, available at: http://www.allsealsinc.com/04_Designing_Plastic.pdf, on Aug. 10, 2015.

* cited by examiner

CUTTING AND DUST OR SLURRY COLLECTING ASSEMBLY AND WORKING MACHINE

CROSS REFERENCE TO RELATED APPLICATIONS

This application is a continuation of U.S. application Ser. No. 13/980,564 filed Oct. 2, 2013, which is a national stage entry of PCT/SE2012/000002 filed Jan. 18, 2012, which claims priority to Swedish application number 1150915-5 filed Oct. 4, 2011 and PCT/SE2011/050053 filed Jan. 18, 2011. The entire contents of applications listed above are hereby incorporated by reference.

TECHNICAL FIELD

The present invention relates to a cutting and dust or slurry collecting assembly for the provision of a kerf (saw cut) with significant depth in a working object, and for collecting and leading away dust or slurry which is generated. Slurry is generated when water is sprayed onto a saw blade to cool it and/or to reduce dust. Dust or slurry can be sucked away by a vacuum source. The invention also relates to a dust or slurry collecting unit included in the assembly, a cover device included in the dust collecting unit, and a working machine which is provided with a cutting and dust or slurry collecting assembly according to the invention. Particularly, the invention relates to devices of the said kind for making openings in working objects like walls, ceilings, and floors of concrete, stone, brick, and plasterboard in the construction industry, and for cutting blocks and columns of concrete, stone, and the like. Such objects often may have large dimensions, but that is not any condition for the applications of the invention. It shall be understood that "cutting assembly" not only includes assemblies for cutting off a work piece but also assemblies for sawing or cutting in objects more generally, for example making holes or openings in work pieces. Normally, "cutting assemblies", such as the cutting assembly according to the invention, can perform all these kinds of work. The terms sawing and cutting, in the following generally referred to as sawing, in this text shall mean every kind of making kerfs/cuts in working objects by means of disk-shaped rotary tools, the working part of which is localized to the periphery of the tool, whether the tool is provided with teeth or not. Typically, the tool consists of a diamond equipped saw blade or a cutting disc, in the following commonly referred to as saw blade.

More particularly, the invention relates to a cutting and dust or slurry collecting assembly that comprises:
 a circular saw blade having a first side, a second side, a peripheral portion defining the working part of the saw blade, and a centre of rotation,
 a blade guard extending over the saw blade around at least half of its circumference
 a cover device, which is elongated in a direction perpendicular to said centre of rotation, and the cover device has a front end, a rear end, a top surface, a bottom surface, elongated sidewalls and possible inner sidewalls, and a longitudinal passage for the saw blade, said passage extending through the cover device from its top surface to its bottom surface in a region between the front and rear ends of the cover device,
 the blade guard and the cover device being pivotally connected or connectable to one another via a hinge in or adjacent to a lower rear corner of the blade guard, such that the cover device and the blade guard can be turned in relation to each other so the saw blade can be moved up and down said passage at least during cutting,
 a discharge member is provided at the rear of said hinge and has an outlet which can be connected to a vacuum source,
 a connection member connects the discharge member with at least one of the longitudinal passage and the cut created rear of the longitudinal passage,
 that the direction of rotation of the saw blade is such that a circumferential part of the blade which has passed beyond the bottom surface of the cover device will move in a direction upwards-rearwards towards the bottom surface, said direction being clock-wise when the saw blade is viewed in a direction towards the first side of the blade.

BACKGROUND OF THE INVENTION

When sawing concrete, brick, stone, wood, plasterboards and similar materials, dust is generated, usually large amounts thereof Many devices of different type are employed in order to prevent, as far as that is possible, but the dust is scattered to the environment, while other devices have been suggested but have not been used. Thus devices exist, whose mode of working, according to a known principle, makes use of a hood-shaped blade guard or the like, which surrounds the saw blade and in which dust is collected and is sucked away to a vacuum device via a hose, which is connected to the blade guard. A machine and a device of that kind is disclosed in WO 02/100597. It is typical and necessary that this known hood-shaped blade guard completely surrounds that part of the saw blade which is not located in the work piece, and that the blade guard contacts the surface of the work piece, which surface is supposed to be essentially flat, and with good sealing action, in order that the device shall function well as a dust collector. The blade guard thus shall function like a suction box, in which a sufficient under pressure must be maintained in order to suck up into the blade guard that dust which is generated in the kerf and which is not thrown backwards-upwards by the tool. At the same time, dust must not be scattered to the environment from the kerf and/or due to leakage between the blade guard and the top surface of the work piece. In connection with devices which are based on this principle, however, some fundamental problems are encountered. The first problem is that the volume in the suction box, i.e. the interior volume of the hood-shaped blade guard, is comparatively large, which is a drawback because it makes it more difficult to maintain a necessary under pressure in the suction box, which in turn jeopardises its suction capacity.

U.S. Pat. No. 5,774,992 discloses a dust collecting shroud for removably attaching to a circular saw. The shroud is attached in a fixed location and will therefore pick up very little dust at the early stages of the cut before the saw reaches the set saw depth. Further the shroud arranged to suck sideways from the saw blade. Therefore the natural peripheral throw of the saw blade is not at all used. This also results in a very wide and bulky total assembly.

US 2008/0163492 shows a very different cutting and dust collecting assembly and is hereby incooperated by reference in its entirety. It has an elongated cover device of approximately the same width as its blade guard. The cover device is joined to the blade guard with a hinge, so the cover device is intended to be in contact with the structure all the time from the start of the cut until full depth of the cut. So this active hinge is a clear improvement. However inside the cover device there is a sealing that does not only decrease air leakage around the saw blade, but does also block air flow rearwards inside the cover device towards a vacuum source arranged in the rear. Instead the complete flow must follow the kerf under the block in the cover device and up into the vacuum source. This reduces the dust removal capacity considerably during all early stages of the cut before a deep kerf is established. Further such a sealing wears considerably and would need to be changed frequently. The cover device is spring loaded to swing down with its forward end. This end will therefore protrude and be a bother during transport etc. But it will also hide the saw blade, so it is difficult for the operator to start the cut correctly. Further the cover device always protrudes in front of the saw blade giving a bad visibility of the cut for the operator. All this causes using and efficiency difficulties for the operator.

SUMMARY OF THE INVENTION

It is an objective to solve or at least reduce the problems discussed above.

It is also a purpose of the invention to provide an assembly which can be used in many different types of working machines using circular saw blades; portable machines as well as wheel carried or rail-mounted machines and/or machines mounted on other mobile carriers.

According to a first aspect of the invention, a rear arm distance, $L_R$, between a hinge, connecting the cover device and the blade guard, and a rear end of the cover device is bigger than 0.2 times a blade radius, R, and preferably bigger than 0.25 R. $L_R$ is bigger than 0.3 R and preferably bigger than 0.35 R and most preferably bigger than 0.4 R. The increased rear arm distance, $L_R$, provides a possibility to operate the machine and assembly in a completely new way. It is possible to turn the cover device downwards by gently pressing the rear end of the cover device against the structure to be cut. This enables to arrange the cover device in a normal high position with its front end close to the blade guard. This is most practical for transport and handling, but above all it is also possible to see the lower edge of the saw blade when first establishing the cut. Immediately thereafter the operator presses the rear end down, so the cover device swings down into the most efficient position for taking up dust or slurry. A floor saw would of course be designed so that this happens automatically. The cover device is preferably arranged in its normal high position in that the hinge is arranged with a spring force urging the front end up towards the blade guard. An alternative is that the hinge is arranged with a friction device or a lock up device strong enough to hold the cover device in a desired turning location, but weak enough to give way when the rear end is pressed gently against the structure to be cut. So compared to US2008/0163492 this provides a new and more efficient way to operate the machine and assembly.

Also the front end will end up radially inside the periphery of the saw blade at least when the cover device is turned upwards towards the blade guard, so the longitudinal passage runs all the way through the front end, i.e. in a forklike manner. This will provide a much better visibility for the operator, as a big part of the saw blade periphery will never be hidden by the cover device. According to a second aspect of the invention, a connection member connects to a longitudinal passage for the saw blade arranged by providing a communication within the cover device, thereby enabling an efficient removal of dust or slurry also when starting the cut and during shallow depth of the cut. This communication has no obstruction in total contrast to the block of US 2008/0163492, that had to suck only through the kerf. Therefore there is now an efficient suction from the longitudinal passage rearwards inside the cover device to a discharge member. As said this is a lot more efficient when starting the cut and during shallow depth of the cut. However it also adds to the efficiency for deep cuts as the sides of the saw blade, and especially the diamond segments and slots between them, will bring dust and slurry up into the longitudinal passage that will best be sucked away rearwards inside the cover device.

The connection member also connects to the cut by having a slot in the bottom surface arranged at least over a part of the length of the bottom surface rear of the longitudinal passage, thereby also enabling an efficient removal of dust or slurry during a deeper depth of cut. So the slot provides a second way of picking up dust or slurry through the bottom surface of the cover device.

However, the invention has been developed in the first case for portable manually operated machines. Therefore, other objectives of the invention is to provide a working machine and an assembly of the above mentioned type intended for the machine, which is easy to operate forwards as well as rearwards, horizontally as well as vertically; in short, satisfies high ergonomic demands.

The term "slot" shall not be interpreted in any restricting sense as far as the width of the slots is concerned. The width can namely be quite large and extend over the major part of the top surface and over a significant portion of the bottom surface, respectively. However, the width is significantly smaller than the length of the slot. Therefore the term "slot" in this connection after all should be adequate. Conveniently, said parts of the cover device are made of steel or other suitable metal material. Unavoidable vibrations of the saw blade, as well as possible errors concerning the centering of the saw blade in relation to the slots in the cover device, pose a risk that the saw blade will touch the edges of the slots, when the saw blade operates, rotating in the cover device, if the slots are too narrow. For safety's sake they are therefore comparatively wide in the preferred embodiment. Suitably, the slot may have a thickness of appr. 10 mm.

The invention also relates to the working machine which is provided with a cutting and dust collecting assembly according to the invention. The working machine includes, in a mode which can be conventional, a driving unit with a driving motor and operating members, and consists according to the invention typically of a portable hand-held machine. The motor may be electric or hydraulic or may be of a combustion engine type. The operating members typically include a rear handle with control members and a front handle. According to this aspect of the invention, the blade guard, and the cover device which is turnably connected with the blade guard, are connected with the driving unit via said side portion of the second side wall of the blade guard, which is connected with the driving unit on one side of the driving unit in the front end portion of the driving unit, turnably about the centre of rotation of the saw blade, while the saw blade is mounted on a driving shaft which extends sideways from the driving unit through said side portion on the second side of the saw blade, said saw blade being rotatable by means of said driving shaft about said centre of rotation in the clock-wise direction, when the saw blade is viewed in a direction towards the first side of the saw blade. This means that dust and other fragments which are loosened from the working object by means of the saw blade is moved backwards in the kerf.

The invention also relates to a blade guard assembly that can work in conjunction with a saw such as a saw including a circular saw blade. In the blade guard assembly, there is a blade guard which comprises a cover for covering at least a portion of a saw blade and a first locking formation on an outer surface of that cover. The blade guard assembly further comprises a blade guard receiver which includes a housing defining an opening and a second locking formation on an inner surface of that housing. At least part of the blade guard, including the first locking formation, can be inserted into the opening defined by the blade guard receiver housing and the first and second locking formations are arranged to cooperate with one another to lock the blade guard to the blade guard receiver when it is inserted therein. The cooperation between the first and second locking formations can be provided by cooperating ridges. Alternatively at least one projection on one of the locking formations can fit into at least one recess on the other respective locking formation. The locking formations on the blade guard and blade guard receiver provide a secure attachment therebetween. The blade guard can connect to different blade guard receivers having different functions providing a wide range of other components and accessories, and so the locking formations enable the blade guard to form a connection with those other accessories or components. Therefore the blade guard assembly is very useful and versatile in practice.

A quick release lock may be provided as part of the blade guard receiver of the blade guard assembly, said quick release lock comprising a moveable locking member which can fit over part of the outer surface of the blade guard when it has been received in and locked to the blade guard receiver. The quick release lock can also include a linking member such as a wire or other connector which connects a portion of the moveable locking member to a portion of the blade guard receiver. The blade guard assembly may also include a hinge provided within or in conjunction with the blade guard receiver. Alternatively, the blade guard receiver may comprise other features such as a splash guard, to act as a barrier between the saw blade and the user when a cutting assembly which includes the blade guard assembly is in use. This means that dust or slurry and fragments which are loosened from the working object by means of the saw blade cutting therethrough, and which is projected in an upwards-rearward direction from the periphery of the saw blade, can be blocked from contacting the user or from contacting another surface behind the saw blade.

The blade guard receiver alternatively comprise a guide for guiding movement of the cutting assembly. The guide means may comprise one or more wheels. So different blade guard receivers provide different functions like a cover, a splash guard or a guide with wheels. As the different blade guard receivers can be exchanged in a second or two also the functions can be rapidly changed.

Further aspects of the cutting and dust collecting assembly, the cover device, and the working machine, are apparent from the accompanying patent claims and from the following description of preferred embodiments of said devices. It shall be understood that terms like upwards and downwards, upper surface, and bottom surface, respectively, etc. refer to a cutting and dust collecting assembly with a cover device placed on a horizontal support. Further, the terms front and rear mean the front end which is turned in the direction in which one normally will work with the machine, and the rear end, respectively, which rear end is positioned in the same end as the terminal member. The terms have been chosen in order to facilitate the understanding of the description and does in no way exclude working ceilings, vertical walls, etc.

BRIEF DESCRIPTION OF DRAWINGS

In the following detailed description of the invention as seen by the operator, reference will be made to the accompanying drawings, in which.

DETAILED DESCRIPTION OF THE INVENTION

Figure 1:
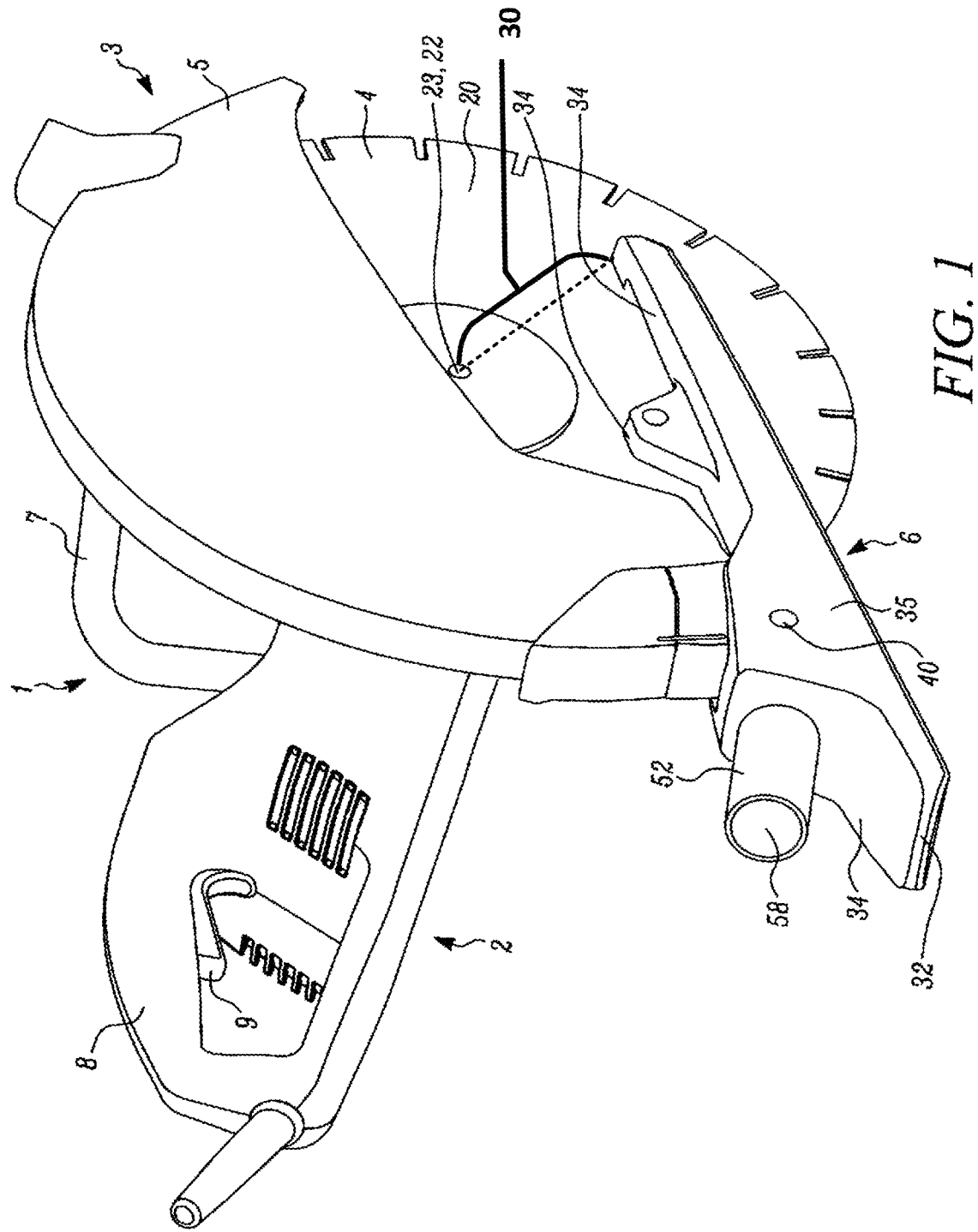
FIG. 1 is a rear perspective view of a cutting and dust collecting assembly according to an embodiment, as seen by the operator from the right side and with its cover device in a normal cutting position.

With reference first to FIG. 1, a working machine according to the invention is generally designated 1. Its main parts consist of a driving unit 2 and a cutting and dust collecting assembly 3. The driving unit 2 may be of any known type, comprising an electric motor, combustion engine or hydraulic motor. According to the embodiment, the driving unit 2 is an electric driving unit of a known type, disclosed in WO 03/057395. The cutting and dust collecting assembly 3 includes a circular saw blade 4, a blade guard 5, and a cover device 6. The driving unit 2 is in a mode known per se provided with front and rear operating handles 7 and 8, respectively, a control device 9 for the electric motor, not shown, in the driving unit 2 and a driving shaft 22.

Figure 4:
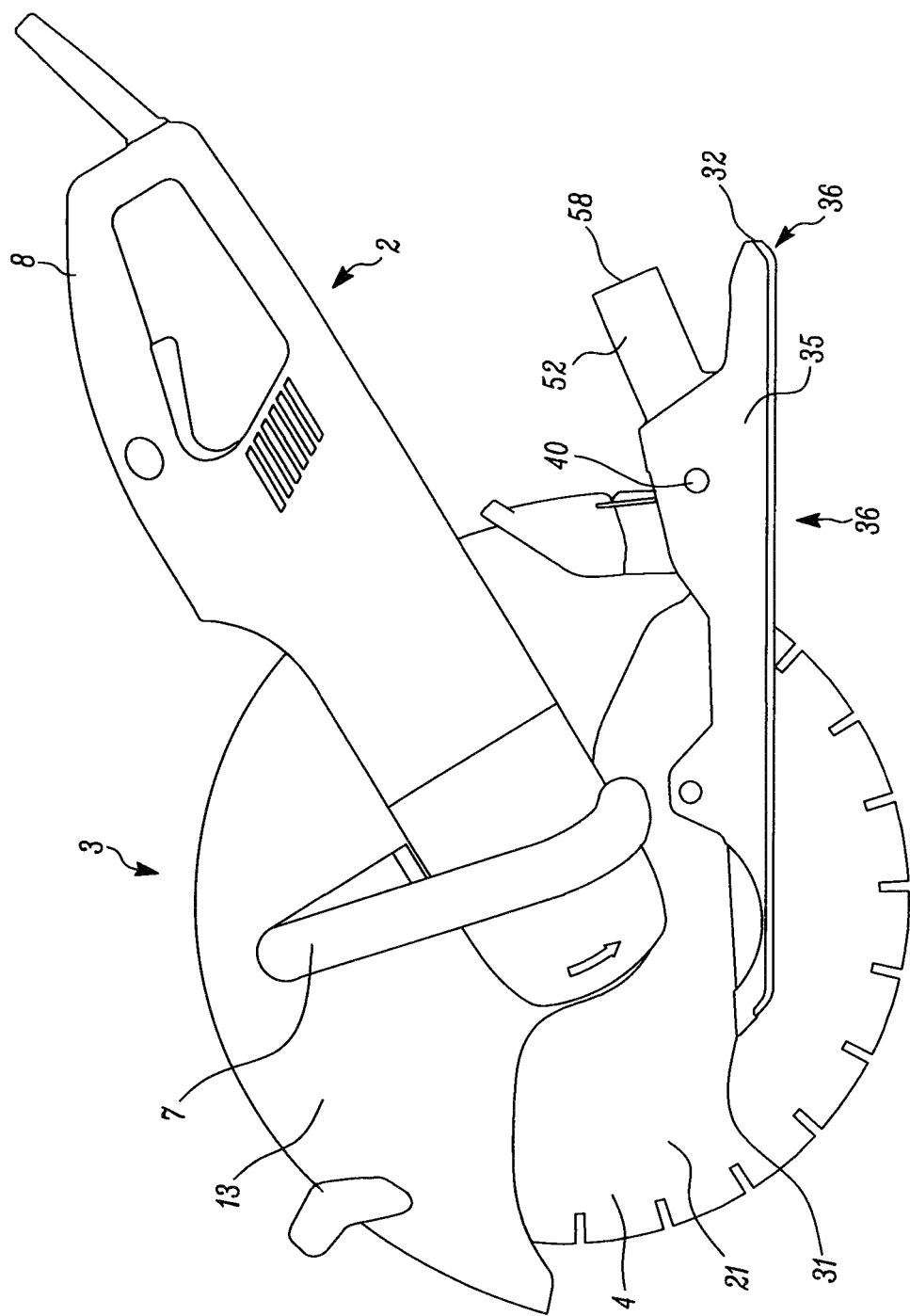
FIG. 4 is a side view also corresponding to FIG. 1, but seen from the opposite, left, side.

The saw blade 4 has a first side 20, which is turned from the driving unit 2, and a second side 21, FIG. 4, which faces the driving unit 2. A side wall facing said second side 21 of the saw blade is designated 13. In said side wall 13 there is an aperture for the driving shaft 22 for the saw blade and means for fastening the blade guard to the driving unit in a mode allowing turning it. As mentioned, the driving shaft 22 forms a part of the driving unit 2. Therefore, per definition, it does not form part of the cutting and dust collecting assembly 3. The driving shaft 22 extends sideways out from the front part of the driving unit through the aperture 14 in the side wall 13 on the second side 21 of the saw blade. The saw blade 4 can be rotated by means of the driving shaft 22 about the axis of rotation 23 of the saw blade and of the driving shaft in a clockwise direction, when the saw blade is viewed in a direction towards the first side 20 of the saw blade. The blade guard 5 can be turned relative to the driving unit 2 about the centre of rotation 23 of the saw blade by mean of the front and rear control handles 7, 8, as the cover device 6 is being pressed against a work object, so that the driving unit 2 can be afforded ap position or be maintained in a position which is comfortable for the operator, independent of the position of the cover device 6. In connection herewith, said centre of rotation 23 defines a first centre of turning of the cutting and dust collecting assembly 3.

A circular driving disc 28 is provided on the first side 20 of the saw blade 4, and on the second side 21 of the saw blade an identical driving disc 28 is pressed against said side of the saw blade inside the blade guard 5. The driving shaft 22 extends through the two driving discs which hold the saw blade 4 clamped between them. The periphery of the saw blade 4 is diamond equipped in a manner known per se. The diamond segments are usually wider than the blank. Therefore they and the slots between the segments tend to transport dust or slurry. But also the blank itself will lift dust or slurry.

Figure 2:
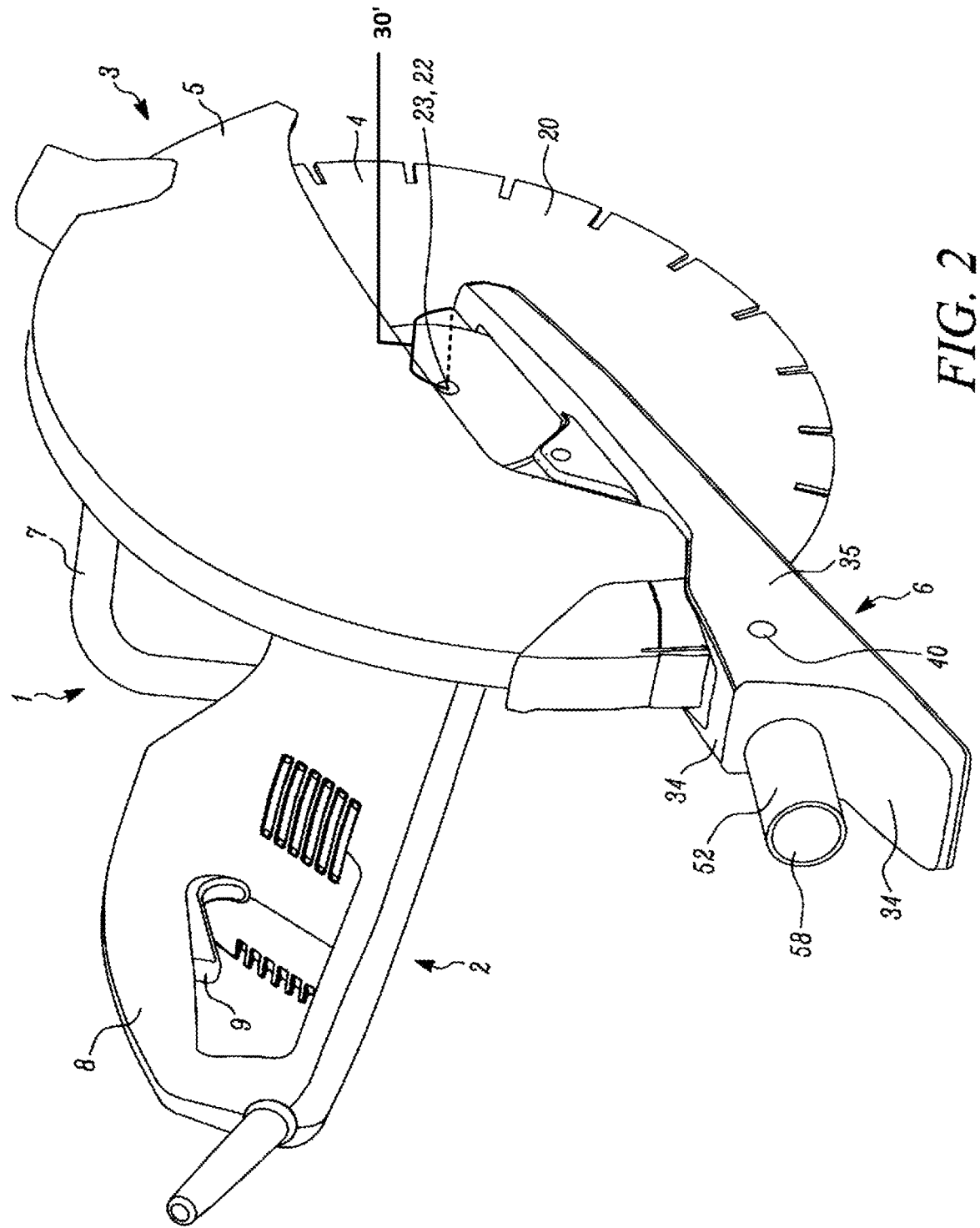
FIG. 2 shows the assembly of FIG. 1, but with its cover device in a raised position suitable for starting to cut.
Figure 3:
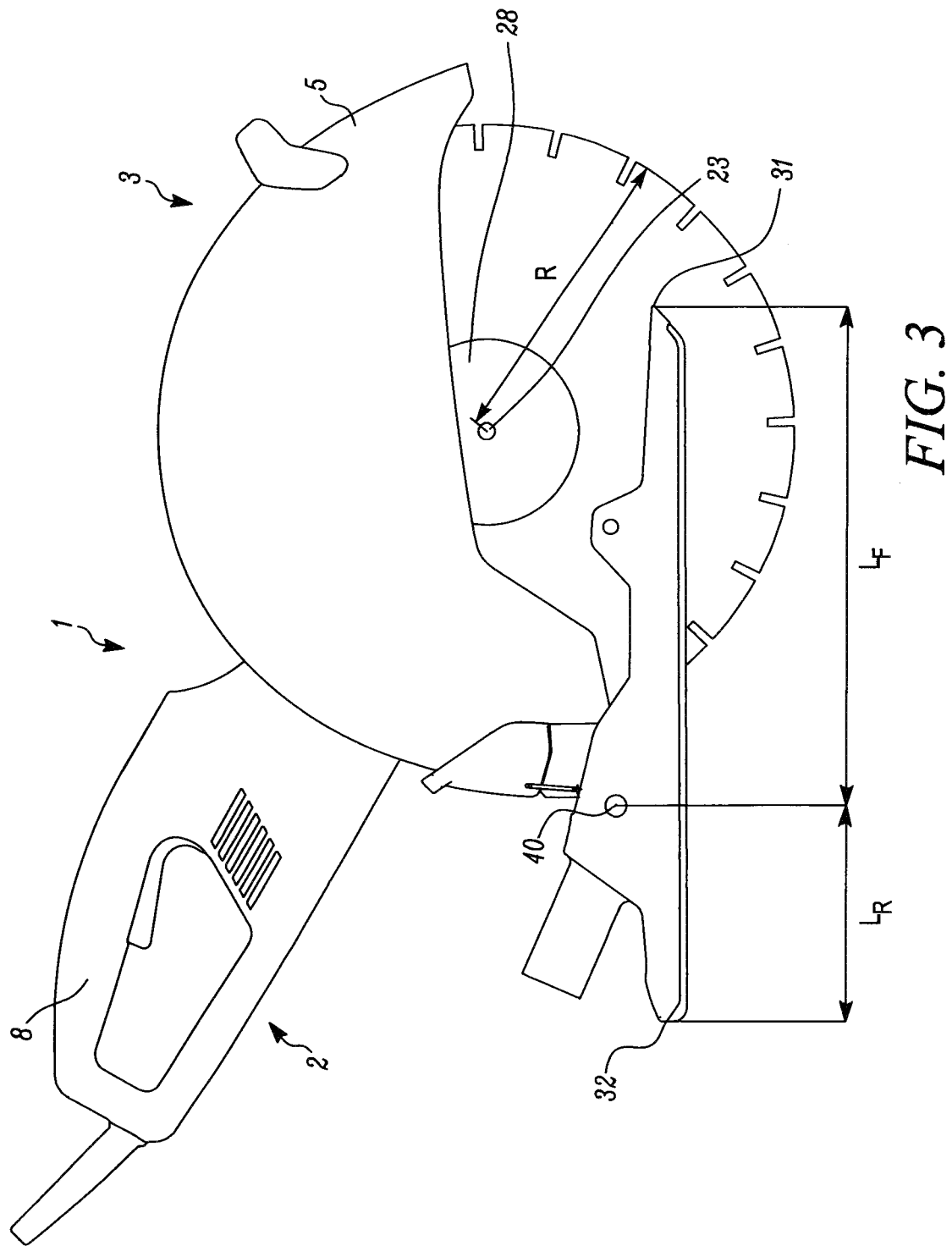
FIG. 3 is a side view corresponding to FIG. 1.

The cover device 6 has a front end 31, a rear end 32, a bottom surface 36 and a top with a top surface 34 and two elongated side walls 35. The cover device can be made of cast aluminium or moulded plastic. The bottom surface 36 is mostly flat, but has upwards pointing ends. The bottom surface is preferably covered with a plate of wear resistant material like stainless steel. Often there are also inner side walls (not shown). The cover device 6 is united with the blade guard 5 through a hinge 40. Therefore the cover device can be turned upwards and downwards around the hinge in relation to the blade guard to thereby change a radial distance 30/30' as shown when comparing FIG. 1 to FIG. 2. As shown in FIG. 3 the hinge is located on a distance $L_R$ from the rear end 32 and on a front end distance $L_F$ from the front end 32. Preferably the cover device is spring loaded to turn upwards around hinge 40 as shown in FIG. 2, while FIG. 1 shows a normal cutting position. There is a discharge member 52 with an outlet 58 that can be attached to a vacuum source like a vacuum cleaner. When an operator starts a new cut he starts by establishing a cut and then press the rear end 32 towards a structure to be cut. This means that the cover device will swing around hinge 40 until the bottom surface 36 is in contact with the structure as shown in FIG. 2. This has the great advantage that it is easy to establish a cut because the cover device is in a top position providing very good visibility of the lower side of the saw blade 4. But as soon as possible the cover device will be pressed down to be even more efficient in picking up dust or slurry. This is a completely new and more efficient way of using the assembly compared to the prior art machine according to US2008/0163492. This is possible because the rear end distance $L_R$ is bigger so it is possible to control the turning of the cover device by pressing the rear end 32 against the structure to be cut. Also the visibility is improved because the front end distance is shorter, so that a part of the saw blade is visible. For the prior art design the cover device always did hide the part of the saw blade that was below the cover device. In the novel design a part of the saw blade is always visible in front of the front end 31. As seen in FIG. 3 a front arm distance $L_F$ between the hinge 40 and the front end 31 is smaller than 2.2 R and preferably smaller than 2.0 R, providing increased visibility of the cut. Even more preferable $L_F$ is smaller than 1.8 and preferably smaller than 1.6.

Figure 5:
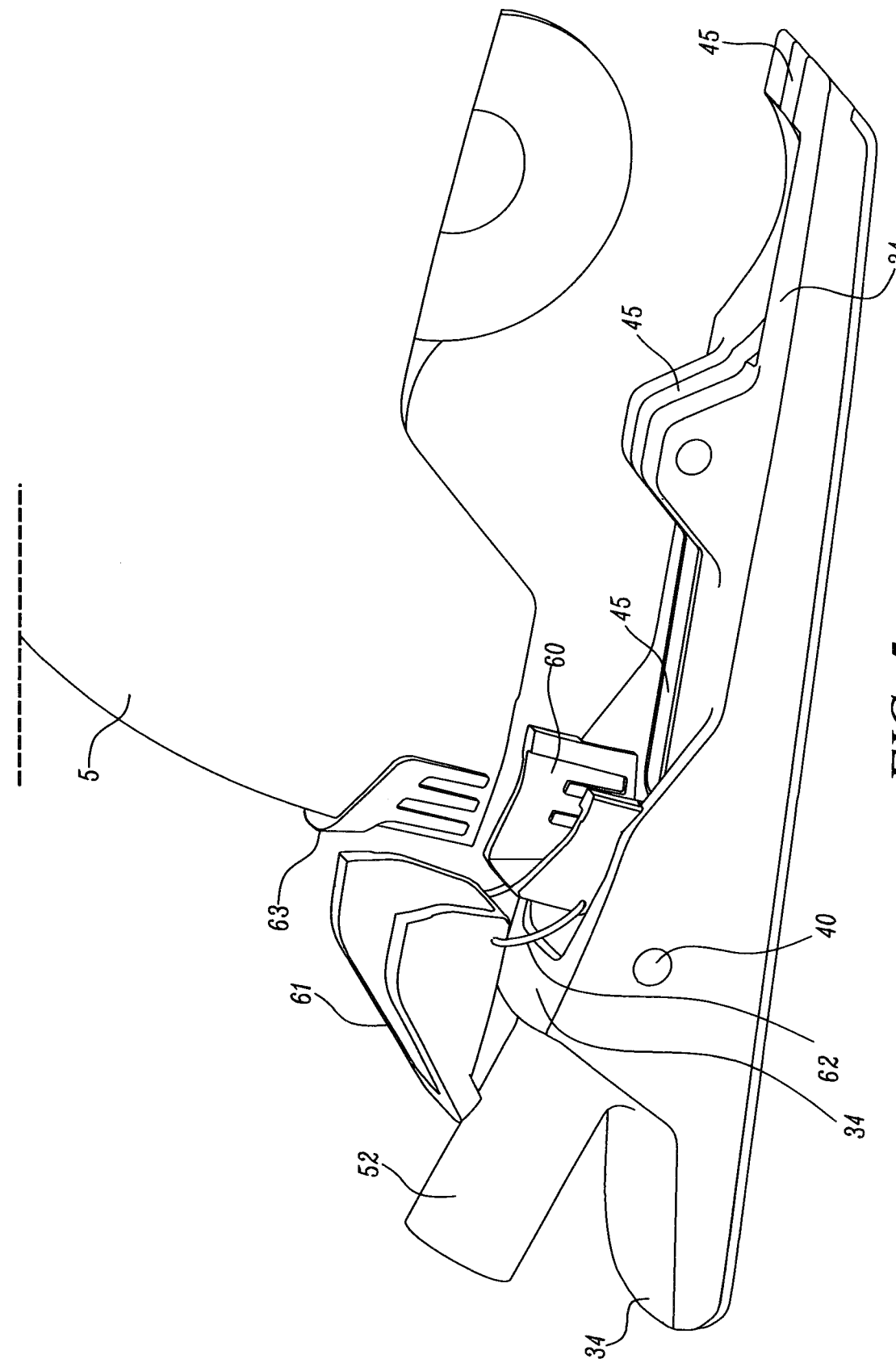
FIG. 5 is left perspective view showing the cover device and the blade guard in a position ready for attaching to the cover device.
Figure 6:
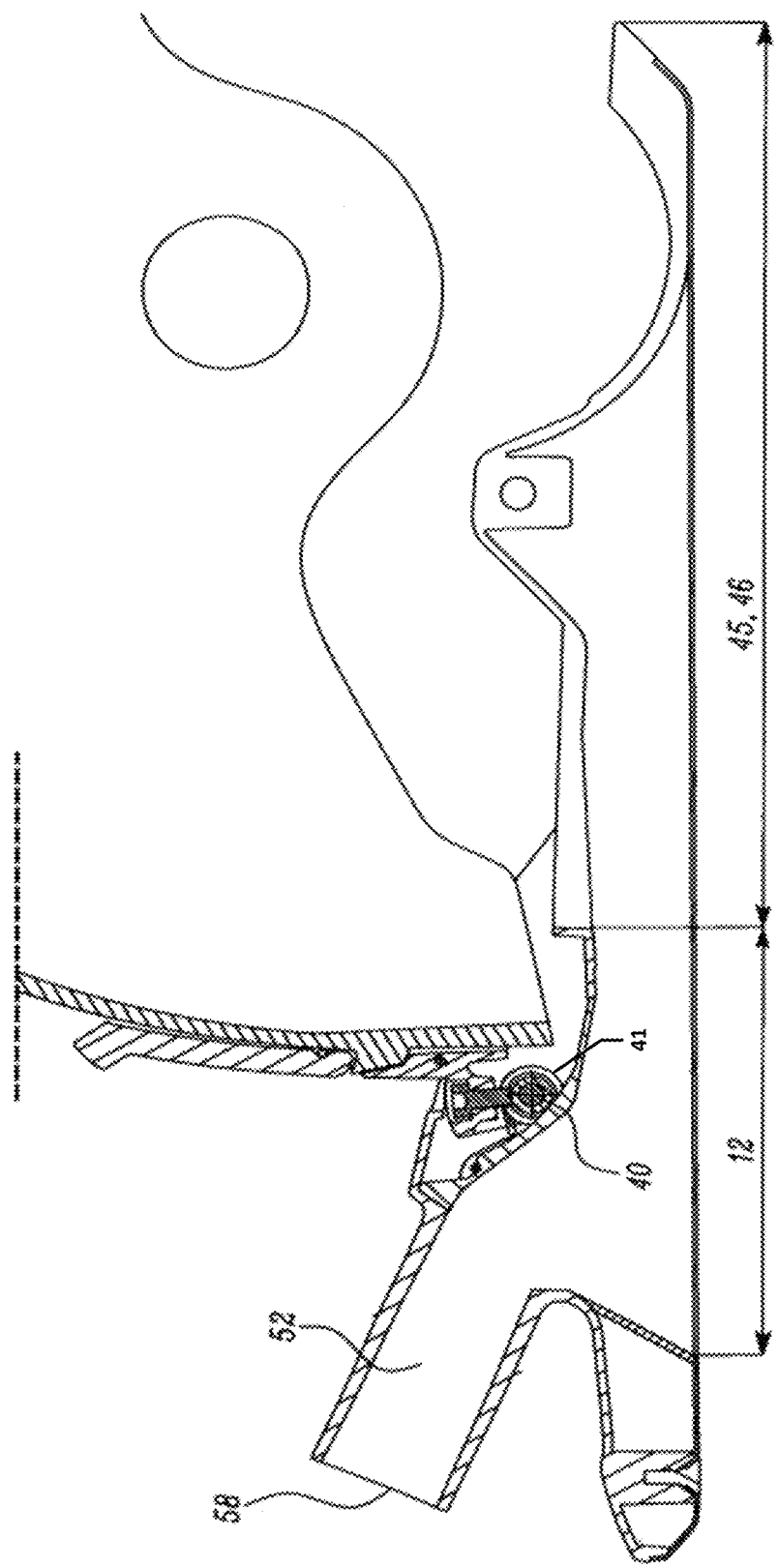
FIG. 6 is an enlarged view in section showing an interior of the cover device and a hinge between the cover device and the blade guard.

As shown in FIG. 5 a top slot 45 and a corresponding bottom slot 46 (not shown) form a longitudinal passage 45, 46 for the saw blade. This passage is shown in FIG. 6 and goes all the way to the front end 31. A discharge member 52 is located behind the hinge 40. To the rear of the longitudinal passage 45, 46 a connection member 12 starts and connects the longitudinal passage to the discharge member 52. This is an important feature compared to the prior art solution acc. to US 2008/0163492. It will provide a more efficient discharge of dust or slurry, especially at the start and early stages of the cut. A bottom slot 46 is provided in the bottom surface 36 and runs all the way of the connection member 12 and of the longitudinal passage 45, 46. It is appr. 10 mm wide and could also be interrupted during the connection member 12.

FIG. 5 shows that the hinge 40 is arranged in a blade guard receiver 60 and that the blade guard 5 can be pushed or moved into it and be locked to it, preferably by a quick-release lock 61, 62 which is shown in FIG. 5 in an unlocked position. The blade guard receiver 60 comprises a housing, preferably a substantially U-shaped housing, defining an opening. The quick release lock includes a locking member 61 which, when the blade guard 5 is locked to the blade guard receiver 60, sits above the blade guard 60 and surrounds a portion of the periphery of the blade guard 5. The quick release lock further comprises a linking member 62 which connects a portion of the locking member 61 to the blade guard receiver 60 so that the locking member 61 can remain attached to the blade guard receiver 60 when the quick release lock is in an unlocked position, even if the blade guard 5 is released from the blade guard receiver 60.

The blade guard 5 is supplied with a locking formation such as an attachment pattern 63, preferably a molded pattern, to fit in the blade guard receiver 60. The molded pattern does not increase the cost of blade guards 5. The attachment pattern 63 has ridges to cooperate with ridges in the blade guard receiver 60. Further it has a top shoulder that the locking member 61 presses against when mounted. As can be seen in FIG. 6, when the blade guard 5 has been fitted into the blade guard receiver 60, the locking member 61 of the quick release lock can be moved into position around the periphery of the blade guard 5. When the quick release lock is in that locked position, the shoulder at the top of the attachment pattern 63 on the blade guard receiver 5 protrudes outwardly, and sits between (and presses against) a lower surface of the locking member 61 and an upper surface of the blade guard receiver 60.

The blade guard receiver 60 can comprise any suitable means for engaging with a blade guard 5. That engaging means may be a moulded pattern including ridges as shown in FIG. 5. But any inter-engagement means using projections, protrusions, lugs or other features may instead be used. There should be a formation on the blade guard and a cooperating formation on or in the blade guard receiver. The two formations should preferably fit together by sliding towards each other and lock together due to interference fit, snap fit or any other suitable fit.

Figure 7:
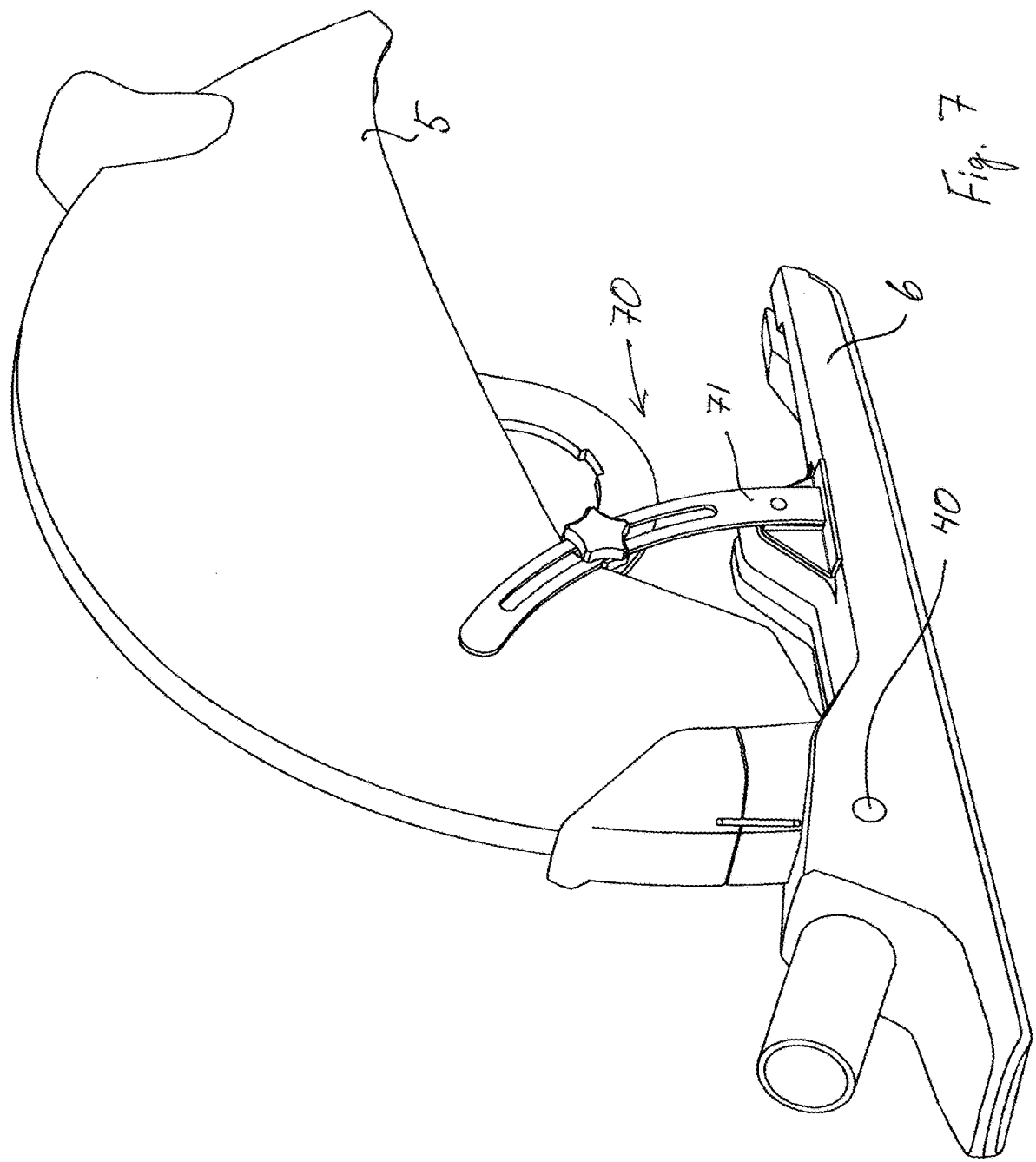
FIG. 7 is a rear perspective view of a cutting and dust collecting assembly according to an improved version of the embodiment of FIG. 1-6 having an adjustable cover device support assembly.

FIG. 7 shows an improved version of the cover device, where the cover device 6 is arranged to have an adjustable cover device support assembly 70 fastened to it. The cover device support assembly is arranged to interact with the the blade guard 5 such that the cover device 6 is prevented from moving closer to the blade guard 5 than a supported position given by a setting of the cover device support assembly 70, thereby limiting the cutting depth of the circular saw blade 4. Preferably the cover device 6 with supporting rider 72 can only move downwards away from the blade guard 5. This makes it possible to use the working machine in a very similar way as has been described earlier for a machine having a cover device without a cover device support assembly 70. In FIG. 2 the cover device has swung all the way up to its position closest to the blade guard, preferably by spring load. This position gives the operator a very good visibility when he starts the cut, and when he has established the wanted cut he loads the rear part 34 of the cover device 6 that than swings down to the surface to cut. In this position the cover device 6 has its highest dust or slurry collecting efficiency.

In FIG. 7 a limited cutting depth has been set, appr. half the maximum cutting depth, by the cover device support assembly 70. And the cover device has swung up to a supported position corresponding to limited cutting depth. This swung up position will give the operator a possibility to see the edge of the saw blade 4 and start the cut. After having done this he can load the rear part 34 of the cover device 6 that than swings down to the surface to cut having maximum dust or slurry collecting efficiency. When he gradually cuts deeper he will eventually reach the supported position shown in FIG. 7, i.e. his wanted cutting depth setting. The possibility for the cover device to swing down thus increases its dust collecting efficiency compared to a fully fixed setting of the cover device support assembly 70. A fully fixed setting is conventional for circular saws.

Figure 8:
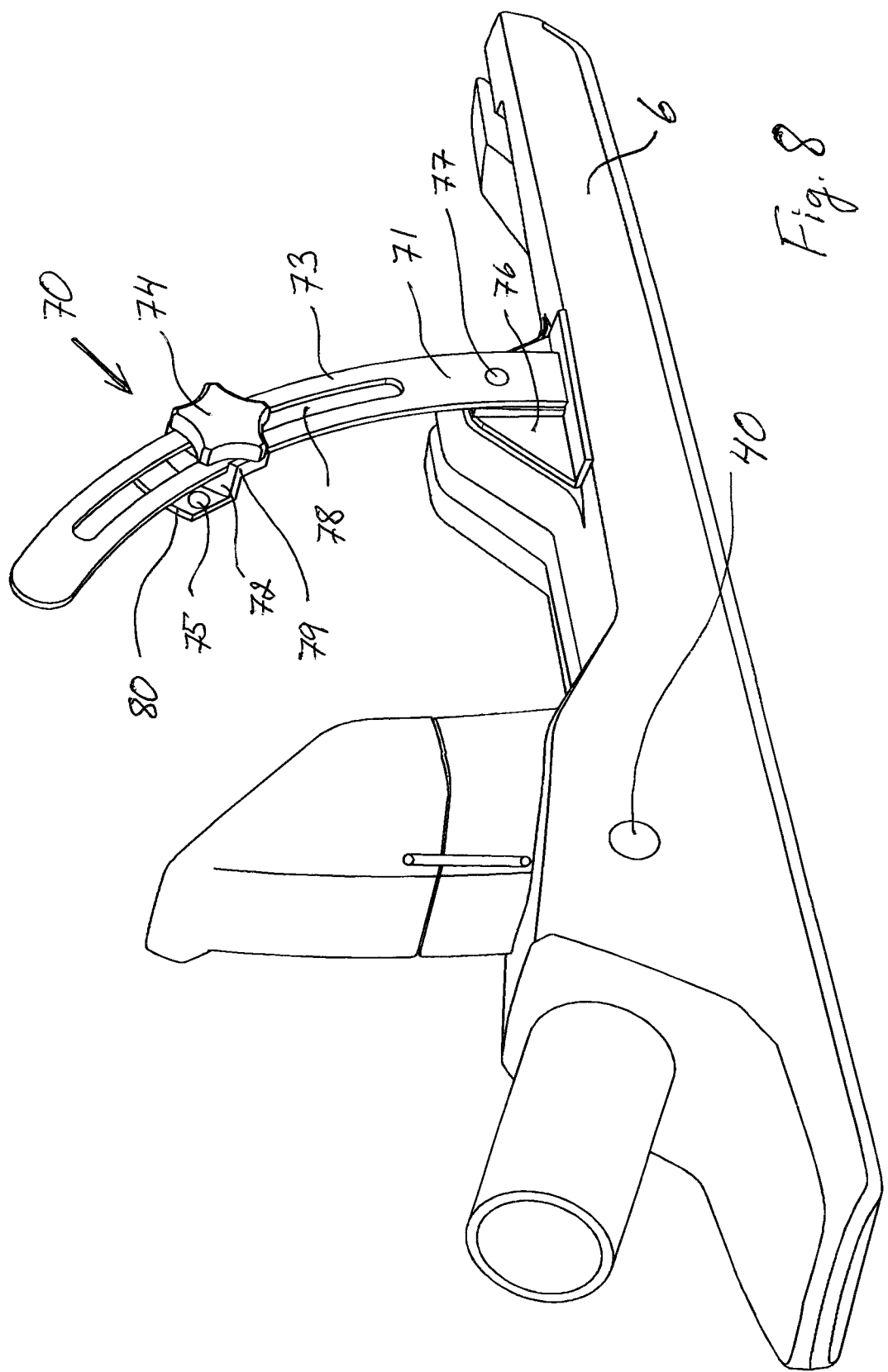
FIG. 8 is a rear perspective view of the cutting and dust collecting assembly of FIG. 7, but without the blade guard to show the adjustable cover device support assembly more fully.

FIG. 8 shows in more detail the design of the cover device support assembly 70 in a preferred embodiment. The cover device support assembly 70 comprises a bracket 71 fastened to rise from the cover device 6 and a supporting rider 72 is arranged on the bracket 71, so that it can be moved along a bracket track part 73 away from or towards the cover device 6 and be fastened at different positions along the track part and support the cover device 6 at different supported positions away from the blade guard 5. In its lower end the bracket 71 has an angled foot 76 and is fastened by a rivet 77. But of course the foot could and bracket could be designed in many different ways and be riveted or screwed to the cover device 6 with a number of screws or rivets or even be glued. The bracket 71 is fixedly fastened to the cover device 6 and the bracket track part 73 is preferably curved appr. around the hinge 40. Here the bracket track part is arranged as a slot in the bracket track part 73, and the supporting rider 72 has a clamping device 74, such as a screw 74, coming through this slot and entering a screw thread in the bracket rider 72. Shoulders 79 on one or both sides of the bracket 71 prevents the rider 72 from rotating along with the screw 74. So when the screw 74 is tightened the rider 72 is clamped to the bracket track part 73. When clamped the rider 72 acts as a support towards the lower edge of the blade guard 5. Preferably it has an inner wall 80 rising on the inside of blade guard wall, and the bracket 71 rising on the outside. So this provides a good support against the blade guard 5.

Of course the bracket track part 73 could be straight and it could be designed differently, e.g. the rider could surround a bracket track part without a slot. Instead the screw 74 could enter a screw thread in the outer side of the surrounding rider and hit the outer side of bracket track part. So when tightened it would clamp the rider to bracket track part 73. Both the preferred solution and this solution has the advantage that the blade guard 5 does not need any connections. It can be a standard design without any adaptions. Of course the cover device support assembly could also be arranged as a cylinder and its ends be turnably fasted to both the cover device 6 and the blade guard. A rider on the inner rod would be clamped to provide the same functionality as described above.

On rare occasions it could be preferable to fix the cover device 6 completely to the cover device by providing the supporting rider 72 with a cover device fixing arrangement, such as a rider hole 75 in the bracket rider 72 and a mating blade guard hole in the blade guard 5 and an adapted pin, so that the pin can lock the cover device when it is in the supported position, by the pin being inserted through the two mating holes. By simply pushing in or taking out the pin it is possible to completely change the functionality from conventional locked to the special functionality described above.

Figure 9:
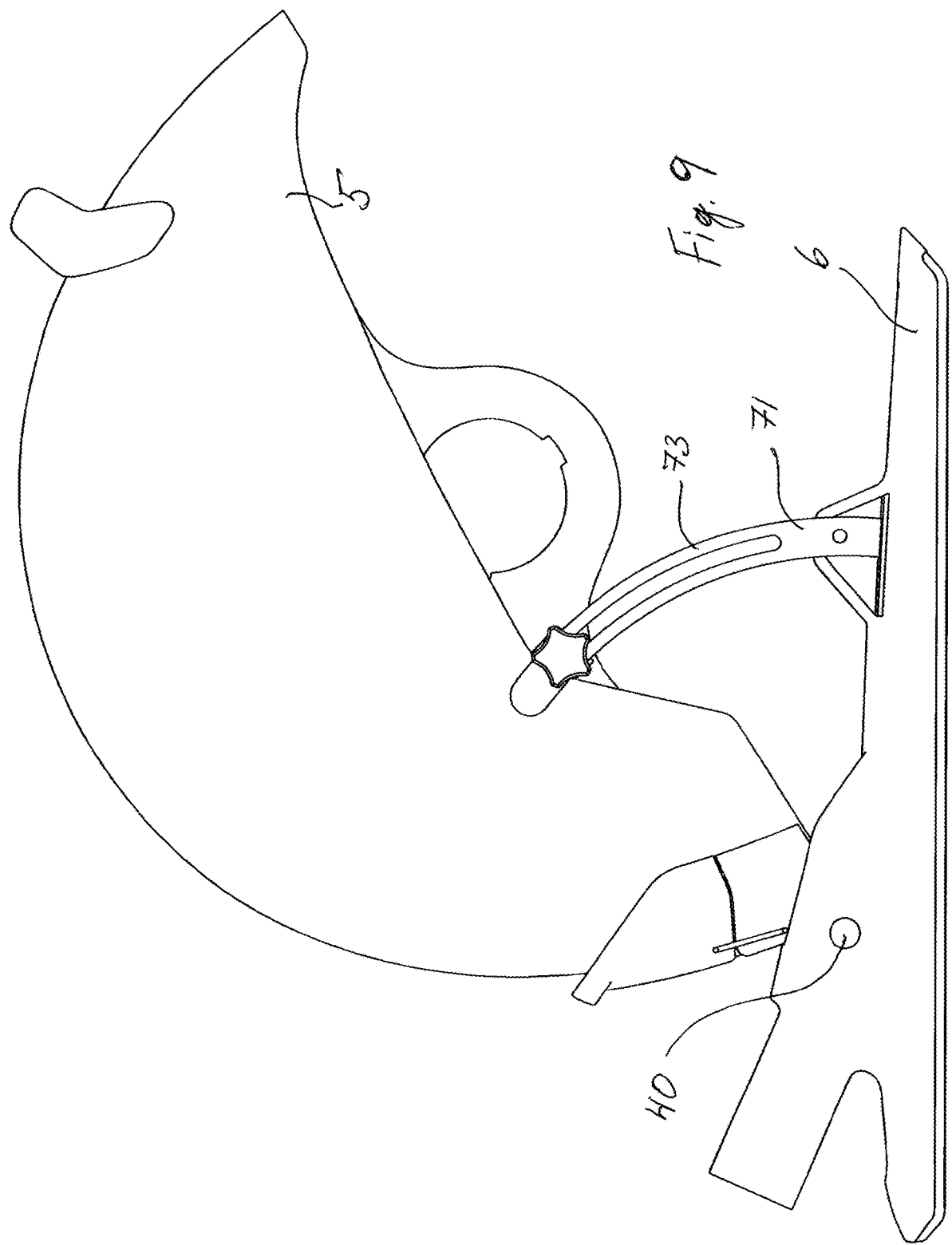
FIG. 9 is a side view of the cutting and dust collecting assembly of FIG. 7, but where the cover device is supported in its lowest position.

FIG. 9 shows a supported position where the cover device 6 is at a maximum distance from the blade guard. In this position the cover device 6 can not turn further down around hinge 40, and the cutting blade 4 does not protrude below the cover device 6. So this is a fixed position that could be fine for transport etc.

It is not always possible or appropriate to connect a cutting assembly to a cover device such as the one described above, or to a vacuum source such as a vacuum cleaner. Furthermore, at times it may be necessary to attach a cutting assembly to another type of accessory or external component. The blade guard receiver 60 described above is versatile and can enable connection of a cutting assembly to a wide range of different accessories.

Figure 10:
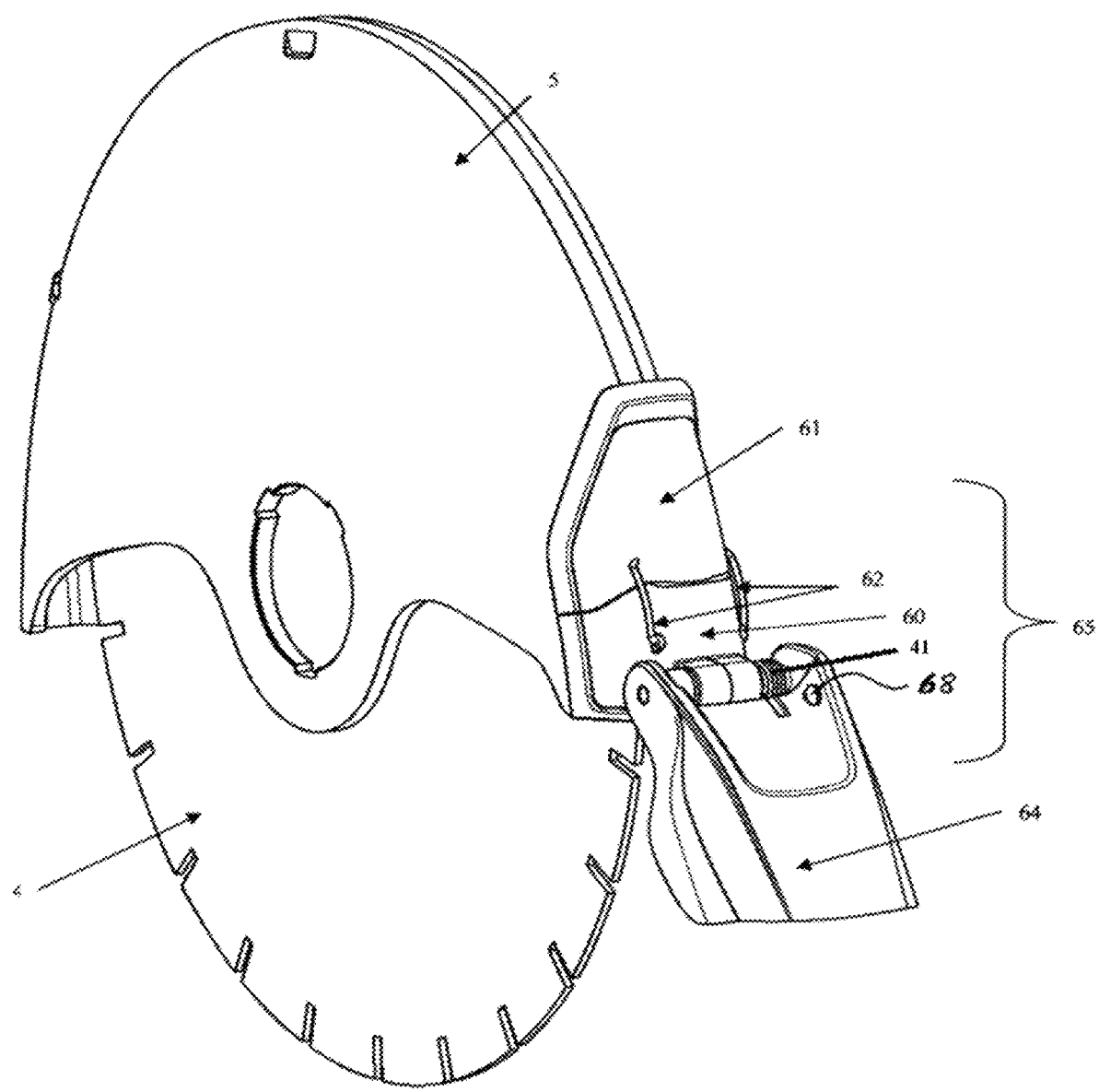
FIG. 10 is a rear perspective view of a cutting assembly according to another embodiment, as seen by the operator from the left side and with its splash guard in a guarding position.

FIG. 10 shows a splash guard assembly 65 including a blade guard 5, blade guard receiver 60, quick release lock 61, 62 and a splash guard 64 extending from the blade guard receiver 60. The splash guard 64 preferably extends from a lower portion of the blade guard receiver housing, and may be hingedly attached to an outer surface of that housing, and can be rotated or otherwise moved about the lower part of the housing from a normal guarding position, as shown in FIG. 10, in which it provides a barrier between a rearward part of the exposed saw blade 4 and the operator standing behind the cutting assembly, to a non-guarding position. The splash guard 64 is preferably a relative stiff unit and can be substantially planar or, as shown in FIG. 10, it can have a substantially U-shaped cross section. The splash guard 64 can be sized and shaped so as to catch dust or slurry that will be thrown from the saw blade 4 in a rearward-upward direction during use, and to block that dust or slurry from contacting the operator or another surface behind the saw. Preferably the splash guard 64 is spring loaded to reach a stop position relatively close to the saw blade 4, but its stiffness hinders it from reaching the saw blade and being cut by it. When sawing the spring loading can make the splash guard turn away from the saw blade when pressed towards the surface to be cut, but stay in contact with the surface.

Figure 11:
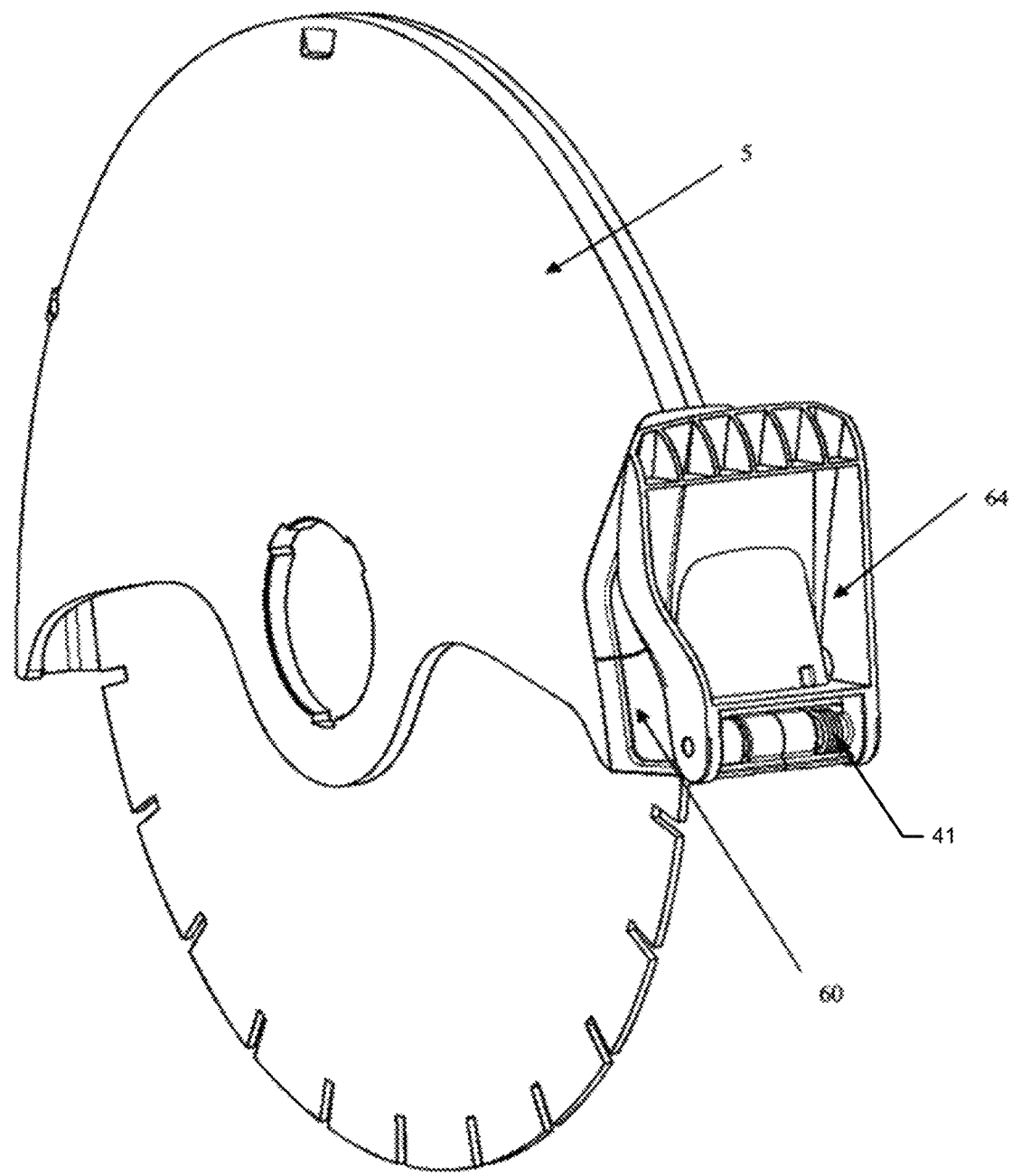
FIG. 11 shows the assembly of FIG. 10, but with the splash guard in a folded, non-guarding position.

The splash guard 64 may be folded upwards as shown in FIG. 11 when it is not to be used. It is held in this upper position in spite of the spring load by a simple locking arrangement. A protruding head 68, e.g. a rivet head, cooperates with a part of the linking member 62 to hold the splash guard in its upper position. Preferably an outer surface of the splash guard 64 should rest against or close to an outer surface of the locking member 61 of the quick release lock, so that the assembly is as compact as possible for storage and portability. The splash guard can be upfolded in a fraction of a second, e.g. when you want it out of the way for cutting close to the floor. The splash guard 64 may be formed from any suitable material, such as plastic.

The splash guard 64 is removably attachable to the blade guard 5, via the blade guard receiver 60. Therefore, for example, the saw blade 4 and blade guard 5 shown in FIG. 13 could be detached from the splash guard assembly 65 and instead attached to a different blade guard receiver which hingedly attaches to a cover device 6 such as the one described in detail here above. Therefore the blade guard 5 can attach to a range of different components and so render a single cutting assembly useful for a range of different purposes.

Figure 12:
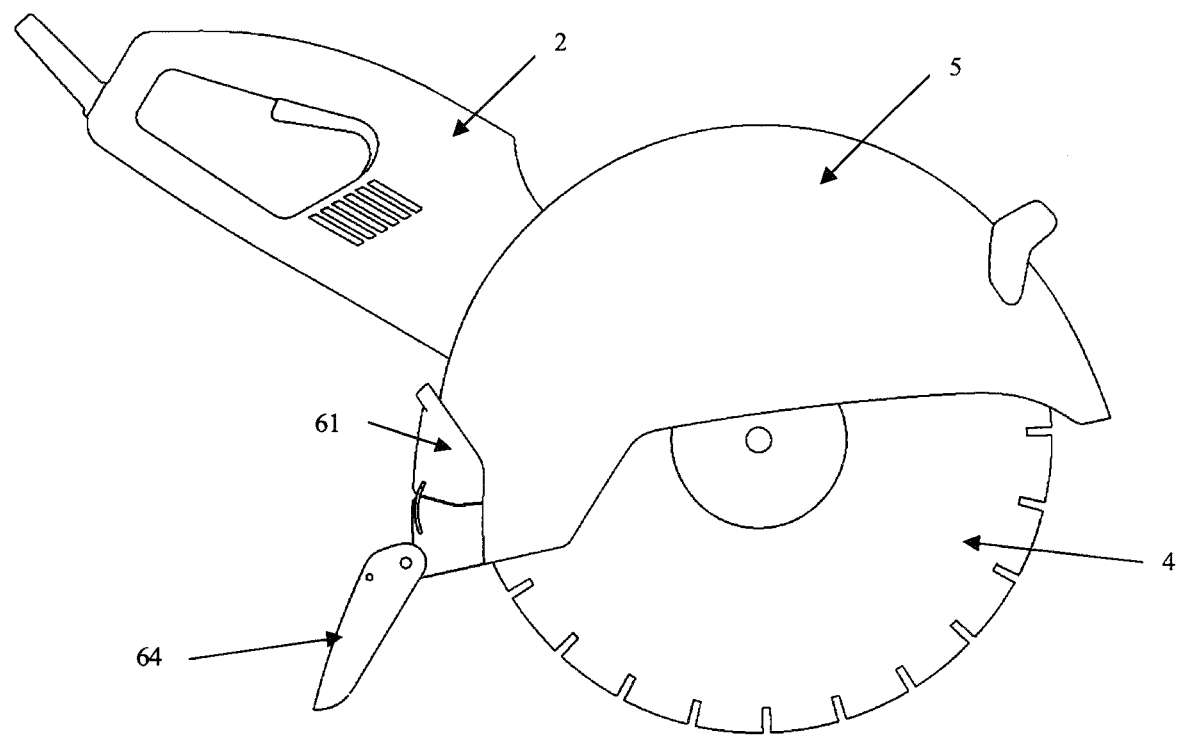
FIG. 12 is a side view corresponding to FIG. 10, but viewed by the operator from the right side, and also showing a driving unit for the assembly.

As shown in FIG. 12, the cutting assembly including a splash guard 64 may be driven by any suitable driving unit, such as the one described in detail with respect to the earlier embodiment herein.

Figure 13:
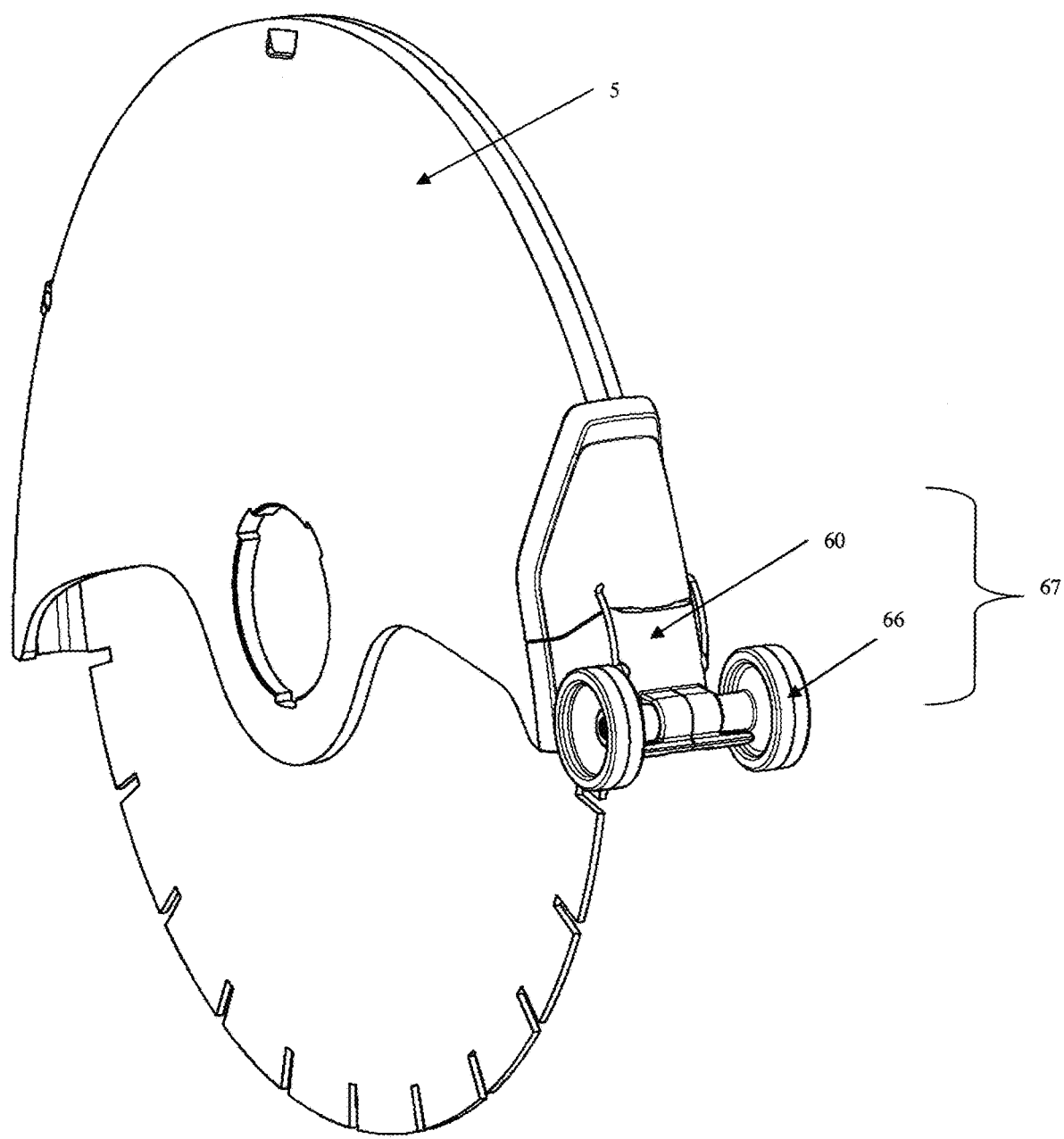
FIG. 13 is a rear perspective view of a cutting assembly according to another embodiment, including a blade guard receiver with wheels forming a wheel accessory, as seen by the operator from the left side.

A blade guard 5 can be attached to other types of accessories. FIG. 13 shows a wheel accessory assembly 67 comprising a blade guard receiver 60 which includes a wheel accessory 66. The wheel accessory 66 can be used for guiding movement of the saw blade 4 of a cutting assembly. For example if the operator was cutting through a substantially flat surface, once the initial cut had been made by the saw blade 4, the wheel accessory 66 could rest on that surface and be rolled along the surface as the operator pushed the cutting assembly forward to progress the cut. The wheel accessory 66 may also guide progress of the cutting assembly across any other type of surface, not just a flat surface.

The wheel accessory 66 is removably attachable to the blade guard 5 via the blade guard receiver 60. Hence a single blade guard 5 can attach to different types of guide means or different wheel accessories, to a cover device, a splash guard or to any other suitable accessory dependent on the requirements for the saw at any particular time.

The wheel accessory 66 preferably comprises two wheels, one either side of the saw blade 4, connected by an axle that runs through part of the blade guard receiver housing. However it is possible for the wheel accessory to comprise more than two wheels or just one wheel. The size of the wheels, including their diameter and track width, can be varied according to user preference and particular requirements for the cutting assembly at any particular time. The wheels may be formed from plastic or from any other suitable material.

The invention claimed is:

1. A cutting and dust or slurry collecting assembly, the assembly comprising:
   a circular saw blade having a first side, a second side, a peripheral portion defining a working part of the saw blade, and a center of rotation;
   a blade guard extending over a portion of the first side and the second side of the saw blade;
   a splash guard operably coupled to the blade guard to act as a barrier between the circular saw blade and a user when the cutting and dust or slurry collecting assembly is in use; and
   a cover device elongated in a direction perpendicular to the center of rotation, the cover device comprising:
      a front end, a rear end, a top surface, a bottom surface, elongated sidewalls, and a longitudinal passage for the saw blade, the longitudinal passage extending through the cover device from the top surface to the bottom surface in a region extending from a position spaced apart from the rear end of the cover device to the front end of the cover device;
      a discharge member disposed proximate the rear end of the cover device, the discharge member including an outlet connectable to a vacuum source; and
      a connection member connecting the discharge member with at least one of the longitudinal passage or a cut created rearward of the longitudinal passage,
   wherein the blade guard and the cover device are pivotably connected via a pivotable connection defining a pivot axis extending between and through the elongated sidewalls of the cover device such that the cover device and the blade guard are turnable in relation to each other so the saw blade is movable up and down the passage at least during cutting to change a radial distance of a portion of each opposing side of the blade that is proximate to the front end of the cover device measured relative to the center of rotation,
   wherein a front arm distance between the pivotable connection of the cover device and the blade guard and the front end of the cover device is less than 2.0 times a radius of the saw blade thereby providing visibility of an edge of the saw blade,
   wherein the cover device and the splash guard are alternately removably operably coupled to the blade guard such that the blade guard is engaged to a selected one of the cover device and the splash guard,
   wherein the assembly further comprises a blade guard receiver that is configured to receive the blade guard,
   wherein the splash guard is operably coupled to the blade guard via the blade guard receiver,
   wherein the blade guard comprises a cover for covering at least a portion of a saw blade and a first locking member is disposed on an outer surface of the blade guard,
   wherein the blade guard receiver comprises a housing which defines an opening and a second locking member on an inner surface of the housing,
   wherein at least part of the blade guard, including the first locking member, is insertable into the opening, and
   wherein said first and second locking members are arranged to cooperate with one another to lock the blade guard to the blade guard receiver when the blade guard is inserted into the blade guard receiver.

2. The assembly of claim 1, wherein one of the blade guard and the blade guard receiver comprises at least one protrusion, and wherein the other of the blade guard and the blade guard receiver comprises at least one receiving portion configured to receive the at least one protrusion to couple the blade guard to the blade guard receiver.

3. The assembly of claim 1, wherein the first locking member comprises ridges provided on the outer surface of the blade guard.

4. The assembly of claim 3, wherein the first locking member comprises a first plurality of ridges and the second locking member comprises a second plurality of ridges configured to form an interference fit with said first plurality of ridges.

5. The assembly of claim 1, wherein the blade guard receiver is arranged in a recess of the top surface of the cover device.

6. The assembly of claim 1, wherein the cover device is arranged to have an adjustable cover device support assembly fastened to the cover device, and the cover device support assembly is arranged to interact with the blade guard such that the cover device is prevented from moving closer to the blade guard than a supported position given by a setting of the cover device support assembly, thereby limiting the cutting depth of the circular saw blade.

7. The assembly of claim 1, wherein a rear arm distance between the pivotable connection and the rear end is larger than 0.2 times the radius of the saw blade thereby enabling a turning of the cover device to change the radial distance of a portion of each opposing side of the blade that is proximate to the front end of the cover device by pressing the rear end toward a structure to be cut by the saw blade.

8. The assembly of claim 1, wherein the splash guard comprises a stiff material that is not flexible.

9. The assembly of claim 1, wherein the splash guard comprises a substantially U-shaped cross section.

10. The assembly of claim 1, wherein the splash guard is spring loaded and pivotable relative to the blade guard receiver.

11. A cover device for a saw blade, the cover device comprising:
a front end;
a rear end;
a top surface;
a bottom surface;
elongated sidewalls; and
a longitudinal passage for the saw blade to pass through, the longitudinal passage extending through the cover device from the top surface to the bottom surface in a region between the front and rear ends of the cover device,
wherein the rear end of the cover device is configured to be pivotably connected via a pivotable connection defining a pivot axis extending between and through the elongated sidewalls of the cover device to a rear end of a blade guard of the saw blade such that the cover device and the blade guard are turnable in relation to each other so that the saw blade is movable up and down the longitudinal passage such that a portion of the longitudinal passage at the front end of the cover device is proximate to a changing radial distance of each opposing side of the saw blade measured relative to the center of rotation at least during a cutting operation,
wherein a front arm distance between the pivotable connection of the cover device and the blade guard and the front end of the cover device is less than 2.0 times a radius of the saw blade,
wherein the cover device comprises a blade guard receiver that is configured to receive the blade guard,
wherein the blade guard comprises a cover for covering at least a portion of a saw blade and a first locking member is disposed on an outer surface of the blade guard,
wherein the blade guard receiver comprises a second locking member and a housing which defines an opening,
wherein at least part of the blade guard, including the first locking member, is insertable into the opening, and
wherein said first and second locking members are arranged to cooperate with one another to lock the blade guard to the blade guard receiver.

12. The cover device of claim 11, wherein the blade guard receiver is arranged in a recess of the top surface of the cover device.

13. The cover device of claim 11, wherein a rear arm distance between the pivotable connection and the rear end is larger than 0.2 times the radius of the saw blade thereby enabling a turning of the cover device to change the radial distance of a portion of each opposing side of the blade that is proximate to the front end of the cover device by pressing the rear end toward a structure to be cut by the saw blade.

14. The cover device of claim 11, wherein a spring is operably coupled between the cover device and the blade guard.

15. A working machine comprising:
a saw blade;
a blade guard comprising a cover for covering at least a portion of both a first side and a second side of the saw blade and a locking formation located at an end portion of the blade guard, the locking formation having portions that correspond to each of the first side and the second side of the saw blade;
a splash guard operably coupled to the blade guard to act as a barrier between the saw blade and a user when the working machine is in use;
a cover device comprising a front end, a rear end, a top surface, a bottom surface, elongated sidewalls, and a longitudinal passage for the saw blade to pass through, the longitudinal passage extending through the cover device from the top surface to the bottom surface in a region extending from a position spaced apart from the rear end of the cover device to the front end of the cover device; and
a blade guard receiver formed integrally with the cover device and configured to receive the locking formation of the blade guard to operably couple the blade guard to the cover device;
wherein the blade guard and the cover device are pivotably connected via a pivotable connection defining a pivot axis extending between and through the elongated sidewalls of the cover device such that the cover device and the blade guard are turnable in relation to each other so the saw blade is movable up and down the passage at least during cutting to change a radial distance of a portion of each opposing side of the blade that is proximate to the front end of the cover device measured relative to the center of rotation,
wherein the cover device and the splash guard are alternately removably operably coupled to the blade guard such that the blade guard is engaged to a selected one of the cover device and the splash guard,
wherein the locking formation comprises a first locking member disposed on an outer surface of the blade guard,
wherein the blade guard receiver comprises a second locking member and a housing which defines an opening,
wherein at least part of the blade guard, including the first locking member, is insertable into the opening, and
wherein said first and second locking members are arranged to cooperate with one another to lock the blade guard to the blade guard receiver.

16. The working machine of claim 15, wherein the first locking member is an aperture in the blade guard and the second locking member is a pin.

17. A cover device for a saw blade, the saw blade being configured to cut a structure during a cutting operation, the cover device comprising:
a front end;
a rear end;
a top surface;
a bottom surface;
elongated sidewalls; and
a longitudinal passage for the saw blade to pass through, the longitudinal passage extending through the cover device from the top surface to the bottom surface in a region between the front and rear ends of the cover device, wherein the rear end of the cover device is pivotably connected via a pivotable connection defining a pivot axis extending between and through the elongated sidewalls of the cover device to a rear end of a blade guard of the saw blade such that the cover device and the blade guard are turnable in relation to each other so that the saw blade is movable up and down the longitudinal passage such that a portion of the longitudinal passage at the front end of the cover device is proximate to a changing radial distance of each opposing side of the saw blade measured relative to the center of rotation at least during the cutting operation, wherein in response to an operator pressing the rear end of the cover device toward the structure to be cut, the cover device is configured to swing around the pivotable connection until the bottom surface of the cover device is in contact with the structure to be cut and the front end rotates away from a center of rotation of the saw blade providing visibility of an edge of the saw blade, wherein a blade guard receiver is configured to receive the blade guard, wherein the blade guard comprises a cover for covering at least a portion of a saw blade and a first locking member is disposed on an outer surface of the blade guard, wherein the blade guard receiver comprises a second locking member and a housing which defines an opening, wherein at least part of the blade guard, including the first locking member, is insertable into the opening, and wherein said first and second locking members are arranged to cooperate with one another to lock the blade guard to the blade guard receiver.

18. The cover device of claim 17, wherein a front arm distance between the pivotable connection of the cover device and the blade guard and the front end of the cover device is less than 1.6 times a radius of the saw blade.

19. A working machine comprising:
a saw blade;
a blade guard comprising a cover for covering at least a portion of both a first side and a second side of the saw blade and a locking formation located at an end portion of the blade guard, the locking formation having portions that correspond to each of the first side and the second side of the saw blade;
a splash guard operably coupled to the blade guard to act as a barrier between the saw blade and a user when the working machine is in use; and
a cover device comprising a front end, a rear end, a top surface, a bottom surface, elongated sidewalls, and a longitudinal passage for the saw blade to pass through, the longitudinal passage extending through the cover device from the top surface to the bottom surface in a region extending from a position spaced apart from the rear end of the cover device to the front end of the cover device, wherein the blade guard and the cover device are pivotably connected via a pivotable connection defining a pivot axis about which the cover device and the blade guard are turnable in relation to each other, wherein the cover device and the splash guard are alternately removably operably coupled to the blade guard such that the blade guard is engaged to a selected one of the cover device and the splash guard, wherein a blade guard receiver is configured to receive the blade guard, wherein the locking formation comprises a first locking member disposed on an outer surface of the blade guard, wherein the blade guard receiver comprises a housing which defines an opening and a second locking member on an inner surface of the housing, wherein at least part of the blade guard, including the first locking member, is insertable into the opening, and wherein said first and second locking members are arranged to cooperate with one another to lock the blade guard to the blade guard receiver when the blade guard is inserted into the blade guard receiver.

* * * * *